US012142216B2

(12) United States Patent
Park

(10) Patent No.: US 12,142,216 B2
(45) **Date of Patent: *Nov. 12, 2024**

(54) ELECTROLUMINESCENT DISPLAY APPARATUS WITH A SENSING CIRCUIT TO SENSE AN ELECTRICAL CHARACTERISTIC OF A PIXEL

(71) Applicant: LG Display Co., Ltd., Seoul (KR)

(72) Inventor: Joon Min Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,389

(22) Filed: Sep. 19, 2023

(65) Prior Publication Data

US 2024/0005863 A1 Jan. 4, 2024

Related U.S. Application Data

(63) Continuation of application No. 17/980,526, filed on Nov. 3, 2022, now Pat. No. 11,790,848.

(30) Foreign Application Priority Data

Dec. 24, 2021 (KR) ........................ 10-2021-0187581

(51) Int. Cl.
*G09G 3/30* (2006.01)
*G09G 3/20* (2006.01)
*G09G 3/3233* (2016.01)

(52) U.S. Cl.
CPC ......... *G09G 3/3233* (2013.01); *G09G 3/2096* (2013.01); *G09G 2300/0842* (2013.01); *G09G 2310/08* (2013.01); *G09G 2320/0233* (2013.01); *G09G 2320/029* (2013.01)

(58) Field of Classification Search
CPC ............... G09G 3/2096; G09G 3/3233; G09G 2300/0842; G09G 2310/08; G09G 2320/0233; G09G 2320/029
See application file for complete search history.

(56) References Cited

U.S. PATENT DOCUMENTS

| | | | | |
|---|---|---|---|---|
| 2018/0103231 | A1 | 4/2018 | Ahn et al. | |
| 2018/0122327 | A1 | 5/2018 | Kim et al. | |
| 2020/0090596 | A1* | 3/2020 | Oh | G09G 3/36 |
| 2022/0215798 | A1 | 7/2022 | Pyun et al. | |
| 2023/0410719 | A1* | 12/2023 | Park | G09G 3/2096 |

* cited by examiner

*Primary Examiner* — Sanghyuk Park
(74) *Attorney, Agent, or Firm* — Morgan, Lewis & Bockius LLP

(57) ABSTRACT

An electroluminescent display apparatus may include: a display panel including a pixel; a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel based on the sensing data voltage in the sensing period within the vertical blank period of the first frame. A level of the display data voltage to be supplied to the pixel in the vertical active period of the second frame may be determined based on a length of the vertical blank period of the first frame.

17 Claims, 11 Drawing Sheets

FIG. 10

| Hsync_CNT | Data Offset |
|---|---|
| X1 | -10 LSB |
| X2 | -5 LSB |
| • • • | • • • |
| X3 | -1 LSB |
| X4 | 0 LSB |

Frame Rate ↓

Data Offset ↑

Prec ↑

$X1 < X2 < X3 < X4$

ELECTROLUMINESCENT DISPLAY APPARATUS WITH A SENSING CIRCUIT TO SENSE AN ELECTRICAL CHARACTERISTIC OF A PIXEL

CROSS-REFERENCE TO RELATED APPLICATIONS

This application is a continuation of co-pending U.S. patent application Ser. No. 17/980,526, filed on Nov. 3, 2022, which claims the priority and benefit of Korean Patent Application No. 10-2021-0187581, filed on Dec. 24, 2021. Each of the above prior U.S. and Korean patent applications is hereby incorporated by reference as if fully set forth herein.

BACKGROUND

Technical Field

The present disclosure relates to a panel driving device, a driving method thereof, and an electroluminescent display apparatus incorporating the same.

Discussion of the Related Art

Each pixel in a typical electroluminescent display apparatus includes a light emitting device capable of self-emitting light and controls the amount of light emitted from the light emitting device with a data voltage based on a gray level of input image data to adjust luminance.

Electroluminescent display apparatuses may use external compensation technology for increasing image quality. The external compensation technology may sense in real time a pixel voltage or current based on an electrical characteristic of a pixel and may modulate input image data on the basis of a sensed result, thereby compensating for an electrical characteristic deviation between pixels.

Electroluminescent display apparatuses may perform a recovery operation on a corresponding pixel after an electrical characteristic of the corresponding pixel is sensed in a vertical blank period of one frame and may thus recover luminance of the corresponding pixel to a display state immediately before sensing.

Because a length of a recovery period (i.e., a charging and holding time of a recovery data voltage) for a sensing pixel may vary based on a frame frequency, electroluminescent display apparatuses of the related art have a problem where a display state of a sensing pixel is not normally recovered, and luminance distortion occurs.

SUMMARY

Accordingly, embodiments of the present disclosure are directed to a panel driving device, a driving method thereof, and an electroluminescent display apparatus incorporating the same that substantially obviate one or more problems due to the limitations and disadvantages of the related art. For example, embodiments of the present disclosure may decrease luminance distortion occurring in a sensing pixel in a variable frame frequency mode.

To achieve these objects and other advantages and in accordance with the purpose of the disclosure, as embodied and broadly described herein, an electroluminescent display apparatus may include: a display panel configured to display an image and including a pixel; a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel based on the sensing data voltage in the sensing period within the vertical blank period of the first frame, wherein a level of the display data voltage to be supplied to the pixel in the vertical active period of the second frame may be determined based on a length of the vertical blank period of the first frame.

In another aspect of the present disclosure, a panel driving device, for use with a display panel configured to display an image and including a pixel, may include: a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel based on the sensing data voltage in the sensing period within the vertical blank period of the first frame, wherein a level of the display data voltage to be supplied to the pixel in the vertical active period of the second frame may be determined based on a length of the vertical blank period.

In yet another aspect of the present disclosure, a panel driving method, for a display panel configured to display an image and including a pixel, may include: supplying a sensing data voltage to the pixel in a sensing period within a vertical blank period of a first frame and sensing an electrical characteristic of the pixel based on the sensing data voltage; supplying a recovery data voltage to the pixel in a recovery period following the sensing period; determining a display data voltage based on a length of the vertical blank period of the first frame; and supplying the display data voltage to the pixel in a vertical active period of a second frame following the first frame.

It is to be understood that both the foregoing general description and the following detailed description of the present disclosure are by way of example and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain principles of the disclosure. In the drawings:

FIG. 10 is a diagram showing a lookup table where data offset values having different magnitudes are mapped to one another based on a length of a recovery period.

DETAILED DESCRIPTION

Figure 1:
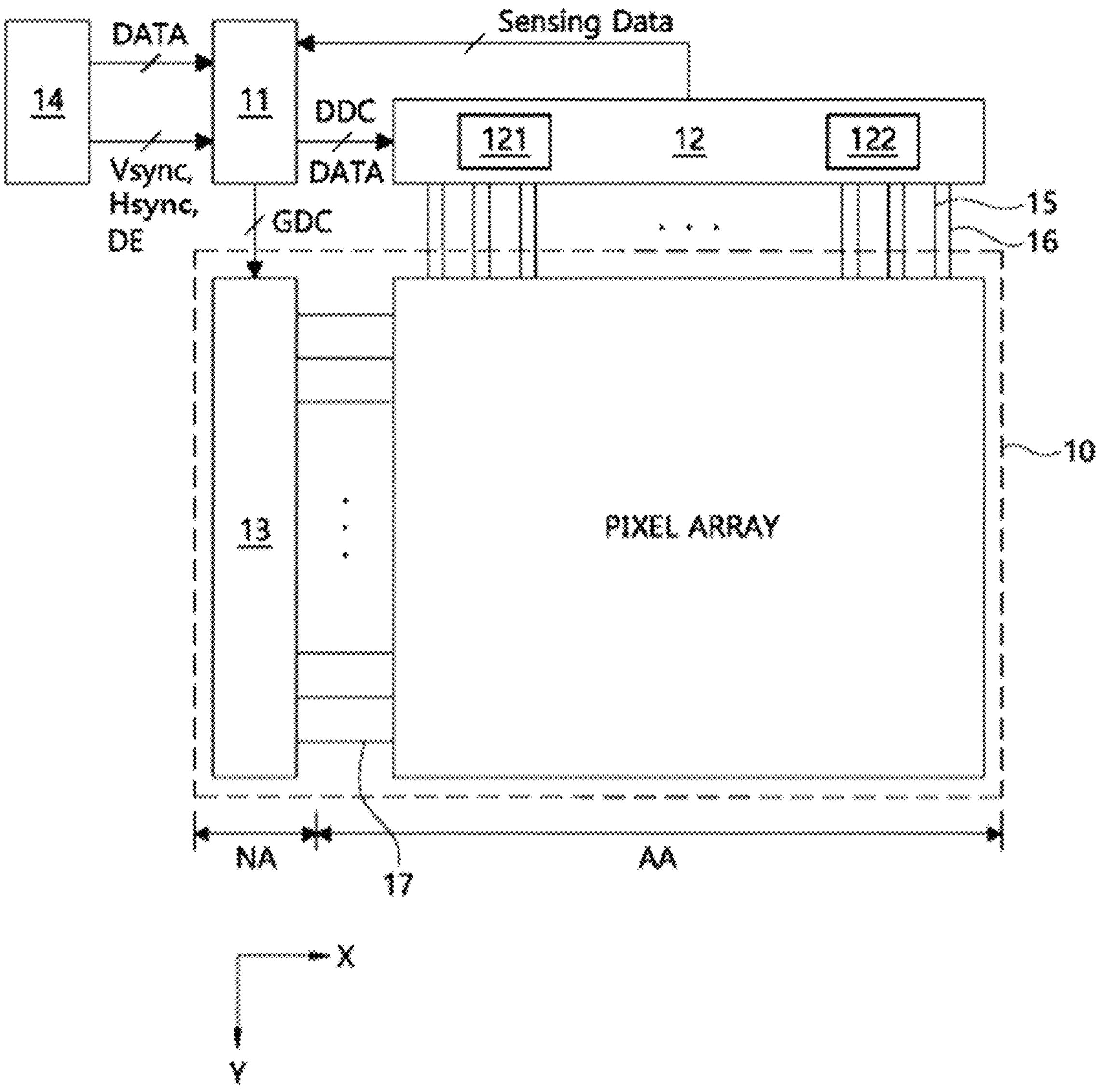
FIG. 1 is a diagram illustrating an electroluminescent display apparatus including a panel driving device according to an example embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure will be thorough and complete to assist those skilled in the art to understand fully the scope of the present disclosure. Furthermore, the protected scope of the present disclosure is defined by claims and their equivalents.

The shapes, dimensions, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified Where the terms "comprise," "have," "include," and the like are used, one or more other elements may be added unless a more limiting term, such as "only," is used. An element described in the singular form, for example with "a" or "an," is intended to include a plurality of elements, and vice versa, unless the context clearly indicates otherwise.

In construing an element, the element is to be construed as including a margin of error or tolerance range even where no explicit description of such a margin of error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

In the specification, a gate driving circuit provided on a substrate of a display panel may be implemented with a thin film transistor (TFT) having an n-type metal oxide semiconductor field effect transistor (MOSFET) structure. However, a gate driving circuit is not limited thereto and may be implemented with a TFT having a p-type MOSFET structure. A TFT may be a three-electrode element which includes a gate, a source, and a drain. The source may be an electrode which supplies a carrier to a transistor. In the TFT, a carrier may start to flow from the source. The drain may be an electrode which enables the carrier to flow out from the TFT. That is, in a MOSFET, the carrier may flow from the source to the drain. In the n-type TFT (NMOS), because a carrier is an electron, a source voltage may have a lower voltage than a drain voltage so that the electron flows from the source to the drain. In the n-type TFT, because the electron flows from the source to the drain, a current may flow from the drain to the source. On the other hand, in the p-type TFT (PMOS), because a carrier is a hole, a source voltage may be higher than a drain voltage so that the hole flows from the source to the drain. In the p-type TFT, because the hole flows from the source to the drain, a current may flow from the source to the drain. It should be noted that a source and a drain of a MOSFET are not necessarily fixed but may be switched. For example, the source and the drain of the MOSFET may be switched with each other. Therefore, in describing embodiments of the present disclosure, one of a source and a drain may be described as a first electrode, and the other of the source and the drain may be described as a second electrode.

In the following description, where the detailed description of the relevant known function or configuration may unnecessarily obscure a feature or aspect of the present disclosure, a detailed description of such known function of configuration may be omitted.

Hereinafter, example embodiments of the present disclosure will be described in detail with reference to the accompanying drawings.

Figure 2:
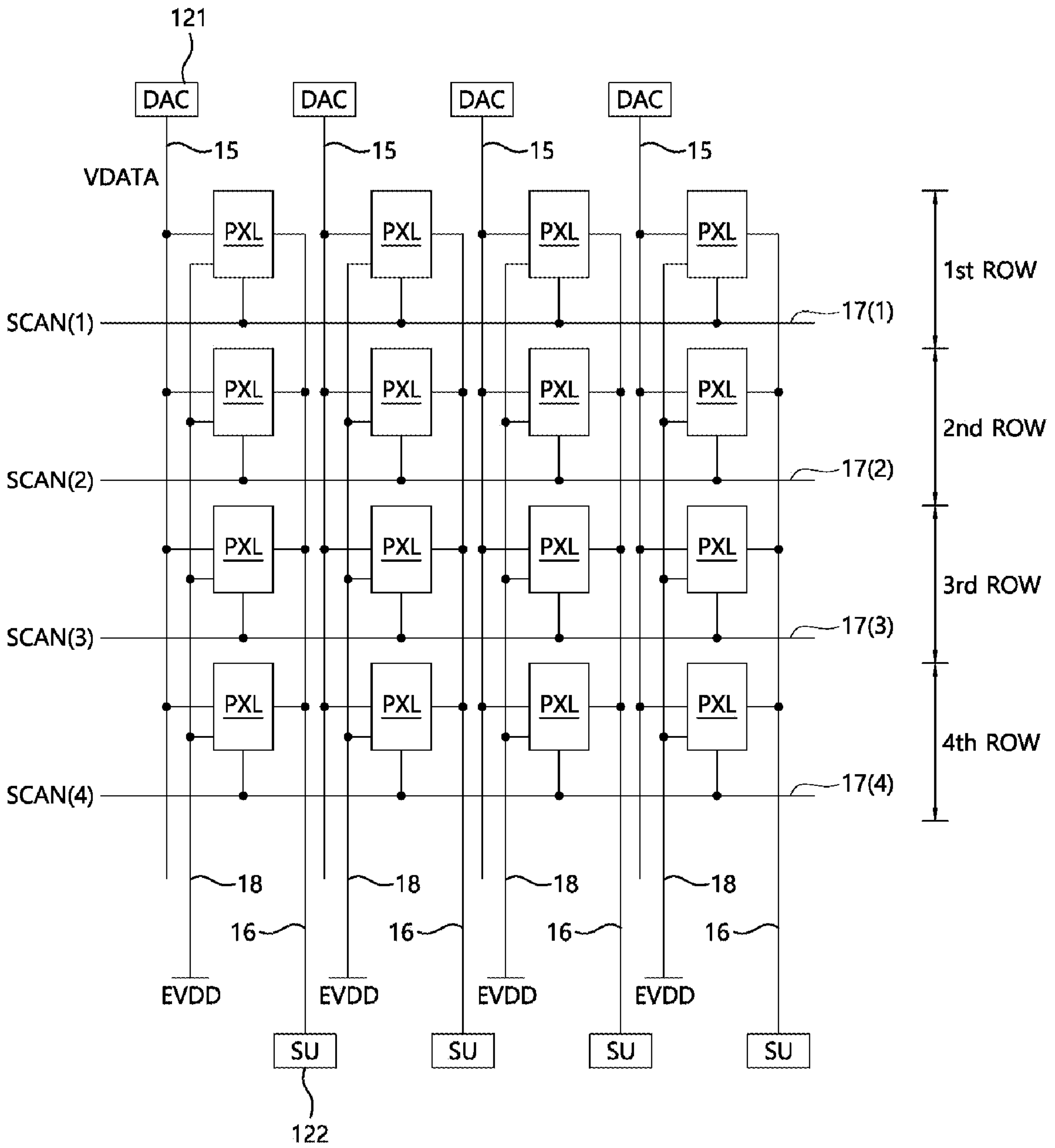
FIG. 2 is a diagram illustrating an example pixel array included in the electroluminescent display apparatus of FIG. 1.
Figure 3:
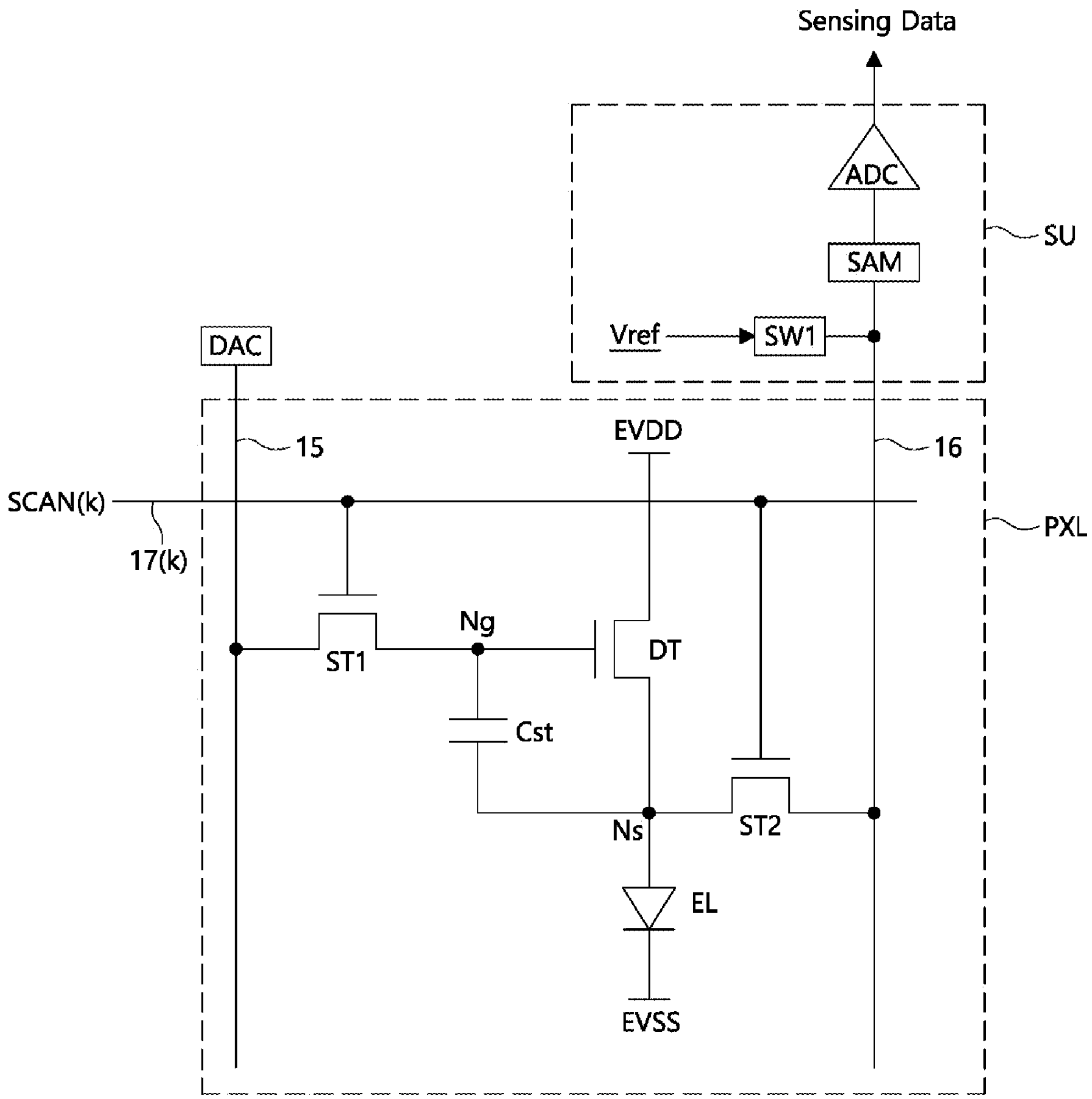
FIG. 3 is a diagram illustrating an example pixel included in the pixel array of FIG. 2 and an example sensing circuit connected thereto.

FIG. 1 is a diagram illustrating an electroluminescent display apparatus including a panel driving device according to an example embodiment of the present disclosure. FIG. 2 is a diagram illustrating an example pixel array included in the electroluminescent display apparatus of FIG. 1. FIG. 3 is a diagram illustrating an example pixel included in the pixel array of FIG. 2 and an example sensing circuit connected thereto.

As illustrated in FIGS. 1 to 3, the electroluminescent display apparatus according to an example embodiment of the present disclosure may include a display panel 10, a timing controller 11, a data driver 12, a gate driver 13, and a sensing circuit 122. In example embodiments of the present disclosure, a data voltage supply circuit 121, the gate driver 13, and the sensing circuit 122 may implement a panel driving device. The data voltage supply circuit 121 and the sensing circuit 122 may be embedded in an integrated circuit (IC) of the data driver 12.

The display panel 10 may include a plurality of data lines 15, a plurality of readout lines 16, and a plurality of gate lines 17. Also, a plurality of pixels PXL may be arranged, respectively, in a plurality of intersection areas between the data lines 15, the readout lines 16, and the gate lines 17. An example pixel array illustrated in FIG. 2 may include the plurality of pixels PXL arranged as a matrix type and may be provided in a display area AA of the display panel 10.

In the pixel array, pixel rows may be implemented with pixels PXL adjacent to one another in an extension direction of the gate line 17 (i.e., an X-axis direction). Each of the pixel rows may include a plurality of pixels PXL adjacent to one another in the X-axis direction. Pixels PXL configuring the same pixel row may be connected to the same gate line 17 and may be connected to different data lines 15. Pixels PXL configuring the same pixel row may be connected to different readout lines 16. However, the pixels PXL are not limited thereto, and a plurality of pixels PXL for implementing different colors may share one readout line 16.

In the pixel array, each pixel PXL may be connected to the data driver 12 through one of the data lines 15 and one of the readout lines 16 and may be connected to the gate driver 13 through one of the gate lines 17. Also, each pixel PXL may be connected to a high-level pixel power EVDD through a high-level power line 18.

In the pixel array, the pixels PXL may include pixels which implement a first color, pixels which implement a second color, and pixels which implement a third color. Moreover, the pixels PXL may further include pixels which implement a fourth color. The first to fourth colors may selectively be one of red, green, blue, and white.

Each pixel PXL may be implemented, for example, as shown in FIG. 3, but the present disclosure is not limited thereto.

An example pixel PXL arranged in a $k^{th}$ (where k is an integer) pixel row, as illustrated in FIG. 3, may include a light emitting device EL, a driving transistor DT, a storage capacitor Cst, a first switch transistor ST1, and a second switch transistor ST2. The first switch transistor ST1 and the second switch transistor ST2 may be connected to the same gate line 17(*k*).

The light emitting device EL may emit light with a pixel current. The light emitting device EL may include an anode electrode connected to a source node Ns, a cathode electrode connected to a low-level pixel power EVSS, and an organic or inorganic compound layer disposed between the anode electrode and the cathode electrode. The organic or inorganic compound layer may include a hole injection layer (HIL), a hole transport layer (HTL), an emission layer (EML), an electron transport layer (ETL), and an electron Injection layer (EIL). When a voltage applied to the anode electrode is higher than an EL operation point voltage compared to the low-level pixel power EVSS applied to the cathode electrode, the light emitting device EL may be turned on. When the light emitting device EL is turned on, a hole passing through the hole transport layer (HTL) and an electron passing through the electron transport layer (ETL) may move to the emission layer (EML) to generate an exciton, and thus, light may be emitted from the emission layer (EML).

The driving transistor DT may be a driving element. The driving transistor DT may generate a pixel current flowing in the light emitting device EL based on a voltage difference between a gate node Ng and a source node Ns. The driving transistor DT may include a gate electrode connected to the gate node Ng, a first electrode connected to the high-level pixel power EVDD, and a second electrode connected to the source node Ns.

The storage capacitor Cst may be connected between the gate node Ng and the source node Ns and may store a gate-source voltage of the driving transistor DT.

The first switch transistor ST1 may electrically connect the data line 15 to the gate node Ng based on a gate signal SCAN(k) and may apply a data voltage VDATA (see, e.g., FIG. 2), charged into the data line 15, to the gate node Ng. The first switch transistor ST1 may include a gate electrode connected to a gate line 17(*k*), a first electrode connected to the data line 15, and a second electrode connected to the gate node Ng.

The second switch transistor ST2 may electrically connect the readout line 16 to the source node Ns based on the gate signal SCAN(k) and may apply a voltage of the source node Ns to the readout line 16 based on the pixel current, or may apply a reference voltage Vref, charged into the readout line 16, to the source node Ns. The second switch transistor ST2 may include a gate electrode connected to the gate line 17(*k*), a first electrode connected to the source node Ns, and a second electrode connected to the readout line 16.

Such a pixel structure may be merely an example embodiment, and the inventive concept is not limited thereto. It should be noted that the inventive concept may also be applied to various other pixel structures for sensing an electrical characteristic (a threshold voltage or electron mobility) of the driving transistor DT.

The timing controller 11 may be connected to a host system 14 through a first interface circuit and may be connected to the data driver 12 through a second interface circuit. The first interface circuit and the second interface circuit may be the same or may differ from each other.

The timing controller 11 may receive a vertical synchronization signal Vsync, a horizontal synchronization signal Hsync, a data enable signal DE, and input video data DATA from the host system 14 through the first interface circuit. The timing controller 11 may receive the input video data DATA in a vertical active period of each frame and may not receive the input video data DATA in a vertical blank period of each frame.

One frame may be defined by the vertical synchronization signal Vsync and the data enable signal DE, and moreover, a vertical active period and a vertical blank period within one frame may be defined. One frame may be defined as an adjacent pulse interval of the vertical synchronization signal Vsync. The vertical active period may be defined as a period within a frame where the data enable signal DE is shifted between a logic high level and a logic low level. The vertical blank period may be defined as a period within a frame where the data enable signal DE is maintained at a logic low level.

A length of the vertical blank period may vary based on the vertical synchronization signal Vsync and the data enable signal DE. The host system 14 may vary a length of the vertical blank period based on the complexity of the input video data DATA and an inter-frame variation amount of the input video data DATA, among other things, to vary a frame frequency while the display panel 10 is being driven. When the input video data DATA is complicated and an inter-frame variation amount is large, for example, the host system 14 may lengthen the vertical blank period in each frame, thereby lowering a frame frequency. When a length of the vertical blank period varies in one frame, a frame frequency and a temporal length of one frame may vary. This may be referred to as variable refresh rate (VRR) technology. The VRR technology may sufficiently secure a rendering time for graphics processing in the host system 14 to prevent a tearing phenomenon of an image and, thus, may provide a smoother image.

The host system 14 may be mounted on a system board. The host system 14 may include an input circuit which may receive a user command/data, a main power circuit which may provide a main power, a VRR control circuit which may vary a frame frequency based on an input image, and an output circuit which may output a transfer signal. The host system 14 may be implemented with an application processor, a personal computer (PC), a set-top box, or a graphics process circuit, among other things, but is not limited thereto.

The timing controller 11 may control the panel driving device to display-drive the display panel 10 and thus may reproduce an input image in the display panel 10. The timing controller 11 may control the panel driving device in the vertical blank period of one frame to sensing-drive the display panel 10 and then may recovery-drive the display panel 10.

Sensing driving may be for sensing an electrical characteristic of the driving transistor DT included in the pixels PXL and may be simultaneously performed, for example, by one pixel row units. In pixels PXL being sensing-driven, light emitting devices may stop emission of light during sensing driving to enhance the accuracy of sensing. The sensing driving may be sequentially or non-sequentially performed by one pixel row units in a vertical blank period of each frame. Pixel rows other than the one pixel row being sensing-driven in the vertical blank period of each frame may maintain a display state of a previous vertical active period.

Recovery driving may be for recovering an emission degree (luminance) of pixels PXL of a sensing pixel row to a display state immediately before the sensing driving, with respect to a pixel row for which the sensing driving has ended (i.e., a sensing pixel row). A recovery data voltage may be applied to the pixels PXL of the sensing pixel row, for the recovery driving. In this case, based on control by the controller 11, the panel driving device may apply the recovery data voltage, having the same level as that of the display data voltage immediately before the sensing driving, to the pixels PXL of the sensing pixel row. Thus, corresponding pixels PXL in the sensing pixel row may emit light again, thereby recovering luminance of the sensing pixel row to a state immediately before the sensing driving.

The timing controller 11 may generate timing control signals of the panel driving device for the display driving, the sensing driving, and the recovery driving. The timing controller 11 may provide the timing control signals to the data driver 12 and the gate driver 13, respectively, through the second interface circuit. The timing control signals of the panel driving device may include a data timing control signal DDC for controlling an operation timing of the data driver 12 and a gate timing control signal GDC for controlling an operation timing of the gate driver 13.

The timing controller 11 may receive sensing result data based on the sensing driving from the data driver 12 through the second interface circuit. An electrical characteristic of the driving transistor DT included in each of sensed pixels PXL may be reflected in the sensing result data. The timing controller 11 may calculate a pixel compensation value based on the sensing result data and may apply the pixel compensation value to the input video data DATA received from the host system 14, thereby compensating for an electrical characteristic deviation of the driving transistor DT between pixels PXL. The timing controller 11 may supply image data DATA, obtained through correction based on the pixel compensation value, to the data driver 12 through the second interface circuit.

The timing controller 11 may control an operation of the panel driving device based on the timing control signals GDC and DDC in a vertical active period of each frame and thus may implement the display driving. In the display driving, the panel driving device may supply all pixels PXL of the pixel array with the display data voltage for displaying an input image.

In the sensing driving, the panel driving device may supply pixels PXL of a sensing pixel row with the sensing data voltage for sensing. In the recovery driving, the panel driving device may supply the pixels PXL of the sensing pixel row with the recovery data voltage for recovering s display state immediately before the sensing driving. Thus, an emission state of pixels PXL which is interrupted in the sensing driving may be recovered by the recovery driving.

The gate driver 13 may be provided in a non-display area NA of the display panel 10, for example, in a gate driver in panel (GIP) type. The gate driver 13 may generate a scan signal SCAN which swings between an on voltage and an off voltage, based on the gate timing control signal GDC. The gate driver 13 may sequentially supply the scan signal SCAN to each of the gate lines 17, including gate lines 17(1) to 17(4) illustrated in FIG. 2, line-by-line in the vertical active period of each frame. The gate driver 13 may supply the scan signal SCAN(1) to SCAN(4) to the gate line 17 connected to the pixels PXL of the sensing pixel row in the vertical blank period of each frame.

The data driver 12 may be implemented with a data IC. The data driver 12 may include a data voltage supply circuit (DAC) 121, which may generate a data voltage VDATA based on the data timing control signal DDC, and a sensing circuit (SU) 122. The data voltage VDATA may be divided into a display data voltage, a sensing data voltage, and a recovery data voltage.

The data voltage supply circuit (DAC) 121 may be connected to the pixel array through one or more of the data lines 15. The data voltage supply circuit (DAC) 121 may generate the display data voltage having a level varying based on a gray level of the image data DATA in the vertical active period of each frame and may supply the display data voltage to the data line(s) 15. The display data voltage may be supplied to the gate node Ng of the pixel(s) PXL in synchronization with the scan signal SCAN. The data voltage supply circuit (DAC) 121 may generate the sensing data voltage in the vertical blank period of each frame and may supply the sensing data voltage to the data line(s) 15. Then, the data voltage circuit (DAC) 121 may generate the recovery data voltage and may supply the recovery data voltage to the data line(s) 15. The sensing data voltage and the recovery data voltage may be supplied to the gate node Ng of sensing target pixel(s) PXL in synchronization with the scan signal SCAN.

The sensing circuit (SU) 122 may be connected to the pixel array through one or more of the readout lines 16. Through the readout line(s) 16, the sensing circuit (SU) 122 may sense a pixel current flowing in the sensing target pixel(s) PXL in response to the sensing data voltage or may sense a source node (Ns) voltage of the sensing target pixel(s) PXL based on the pixel current. The pixel current or the source node (Ns) voltage may be an electrical characteristic of the sensing target pixel(s) PXL and may vary based on the degree of degradation of the sensing target pixel(s) PXL.

The sensing circuit (SU) 122 may be implemented as a voltage sensing type which samples the source node voltage or may be implemented as a current sensing type which samples the pixel current.

An example voltage sensing type sensing circuit (SU) 122, as illustrated in FIG. 3, may include a sampling circuit SAM and an analog-to-digital converter ADC. The sampling circuit SAM may directly sample a source node voltage of the sensing target pixel PXL stored in a parasitic capacitor (not shown) of the readout line 16. The analog-to-digital converter ADC may convert an analog voltage, obtained through sampling by the sampling circuit SAM, into a digital sensing result value and may transfer the digital sensing result value to the timing controller 11.

A current sensing type sensing circuit (SU) 122 may, for example, include a current integrator, a sampling circuit, and an analog-to-digital converter. The current integrator may determine an integral of the pixel current flowing in the sensing target pixel PXL to output a sensing voltage. The sampling circuit may sample the sensing voltage which is output from the current integrator. The analog-to-digital converter may convert an analog voltage, obtained through sampling by the sampling circuit, into a digital sensing result value and may transfer the digital sensing result value to the timing controller 11.

In each of the display driving, the sensing driving, and the recovery driving, the sensing circuit (SU) 122 may turn on a first switch SW1 to allow the reference voltage Vref to be charged into the readout line 16, based on a timing at which the data voltage VDATA is supplied to the data line 15. The reference voltage Vref charged into the readout line 16 may be supplied to the source node Ns of the pixel PXL in synchronization with the scan signal SCAN.

Figure 4:
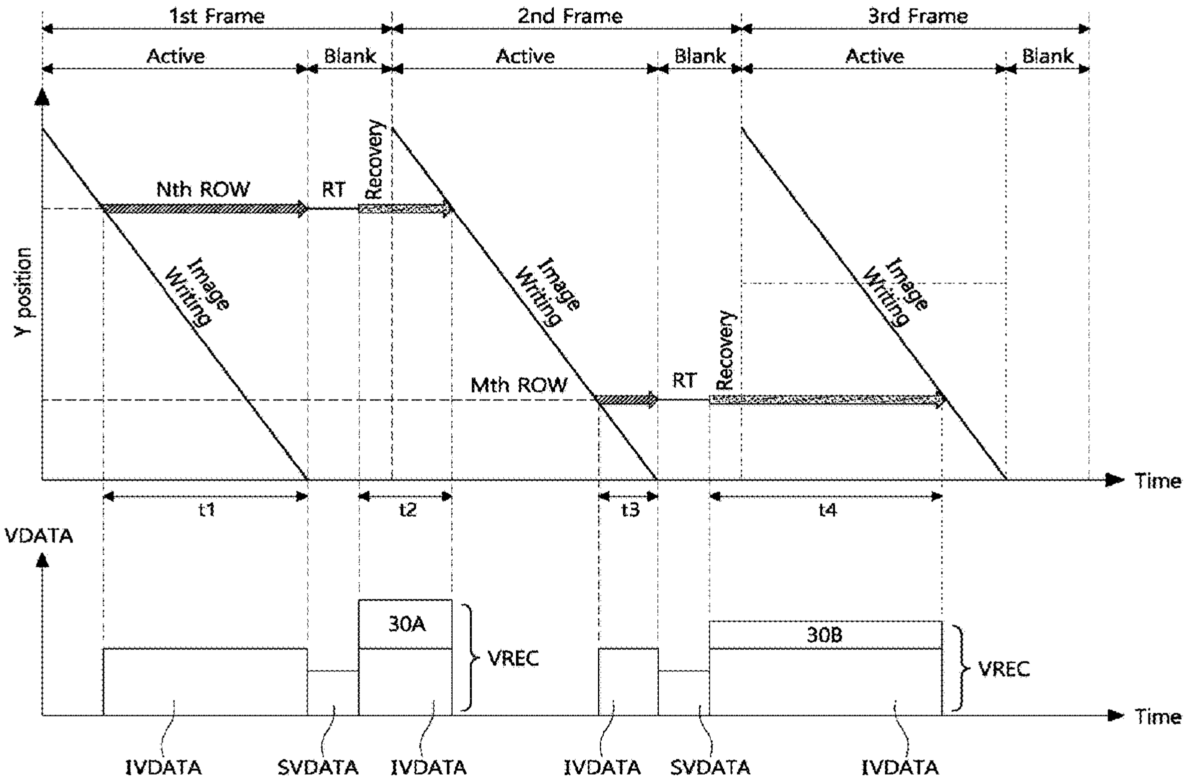
FIG. 4 is a diagram illustrating a display operation timing, a sensing operation timing, and a recovery operation timing in a fixed frame frequency mode in a comparative example of the present disclosure.

FIG. 4 is a diagram illustrating a display operation timing, a sensing operation timing, and a recovery operation timing in a fixed frame frequency mode in a comparative example of the present disclosure.

As shown in FIG. 4, each frame may include a vertical active period and a vertical blank period. The panel driving device may write display data voltage IVDATA, corresponding to image data, in all pixels while sequentially scanning all pixel rows of a pixel array in the vertical active period under the control of the timing controller. Thus, the panel driving device may display-drive the display panel. The panel driving device may select a predetermined sensing pixel row (N, M) in a sensing period RT of the vertical blank period on the basis of control by the timing controller and may supply a sensing data voltage SVDATA to pixels of the sensing pixel row (N, M) to sensing-drive the display panel. Then, the panel driving device may supply a recovery data voltage VREC to the pixels of the sensing pixel row (N, M) in a recovery period of the vertical blank period to recovery-drive the display panel. The pixels of the sensing pixel row (N, M) may be turned on (emit light) based on the display driving, may be turned off (may not emit light) in the sensing driving, and may be turned on (emit light) again based on the recovery driving. The pixels of the sensing pixel row (N, M) may be recovered to an image data display state (i.e., the vertical active period) immediately before sensing through the recovery driving.

Furthermore, an $N^{th}$ pixel row where a sensing operation and a recovery operation are performed in a vertical blank period of an $N^{th}$ frame and an $M^{th}$ pixel row where a sensing operation and a recovery operation are performed in a vertical blank period of an $M^{th}$ frame may not emit light in performing a sensing operation. Thus, a luminance difference between non-sensing pixel rows may occur, and the sensing pixel rows (N, M) may be seen in a line form.

To decrease the visibility of the sensing pixel rows (N, M), a panel driving device may supply the sensing pixel rows (N, M) with a recovery data voltage VREC including recovery compensation values 30A and 30B under the control of a timing controller. The recovery compensation values 30A and 30B may vary based on the sensing pixel rows (N, M). This is because positions of the sensing pixel rows (N, M) may differ in a display panel, and thus, charging & holding periods t2 and t4 (i.e., a recovery period) corresponding to the recovery data voltage VREC may differ between the sensing pixel rows (N, M).

The $N^{th}$ pixel row may be arranged closer to an upper end of the display panel and may have a relatively high scan order in a vertical active period. Thus, the $N^{th}$ pixel row may be supplied with the recovery data voltage VREC including a relatively large compensation value 30A. On the other hand, the $M^{th}$ pixel row may be arranged closer to a lower end of the display panel and may have a relatively low scan order in the vertical active period. Thus, the $M^{th}$ pixel row may be supplied with the recovery data voltage VREC including a relatively small compensation value 30B. As described above, when a level of the recovery data voltage VREC is adjusted based on a length of a recovery period, a luminance deviation between the sensing pixel rows (N, M) may be reduced.

The concept described above may be applied only to the fixing frame frequency mode and may not be applied the variable frame frequency mode, such as the VRR technology. This is because a length of a recovery period based on a pixel row at the same position may vary based on a frame frequency in the variable frame frequency mode, but at a time of the recovery data voltage VREC being supplied, how the length of the recovery period may vary may not be known to or determined by the timing controller.

Figure 5:
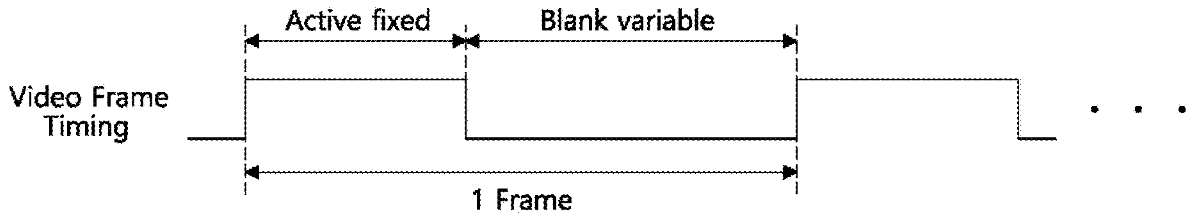
FIGS. 5 and 6 are diagrams for describing variable refresh rate (VRR) technology which varies a frame frequency on the basis of an input image.
Figure 6:
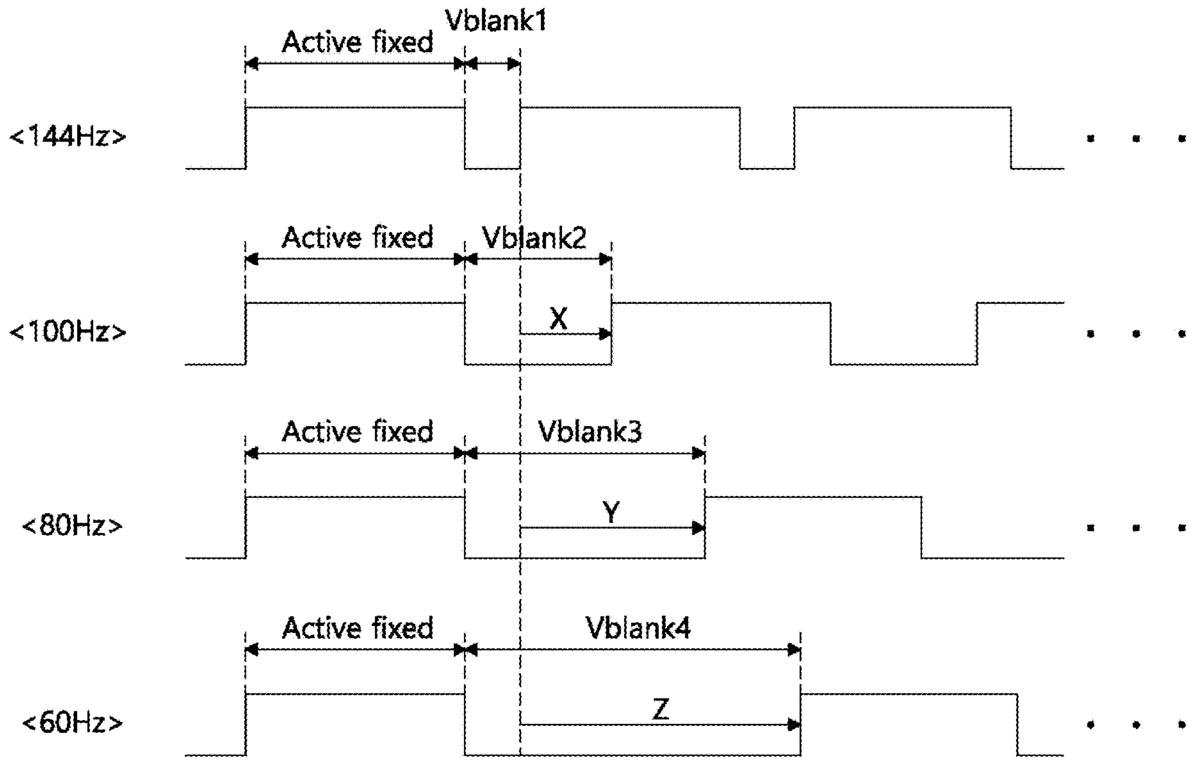

FIGS. 5 and 6 are diagrams for describing VRR technology which may vary a frame frequency based on an input image.

As shown in FIG. 5, a host system may vary a length of a vertical blank period (i.e., a length of a non-transition period of a data enable signal DE) based on a data rendering time of an input image to vary a frame frequency. A problem such as screen disconnection, screen shaking, or input delay, among others, caused by a sudden change in image may be solved with a variation in the frame frequency. The host system may adjust a frame frequency within a frequency range of 40 Hz to 240 Hz based on the data rendering time of the input image. Particularly, for a still image, the host system may adjust the frame frequency within a frequency range of 1 Hz to 10 Hz, but the present disclosure is not limited thereto. A range of a variable frame frequency may be differently set based on the model and the device specification.

The example host system, as illustrated in FIG. 5, may fix a length of a vertical active period and may adjust the length of the vertical blank period based on the data rendering time of the input image, thus varying the frame frequency. For example, as illustrated in FIG. 6, in implementing a 144 Hz mode, the host system may set the length of the vertical blank period to "Vblank1" and may adjust the length of the non-transition period of the data enable signal DE to correspond to "Vblank1." In implementing a 100 Hz mode, the host system may set the length of the vertical blank period to "Vblank2" which is greater than "Vblank1" by "X" and may adjust the length of the non-transition period of the data enable signal DE to correspond to "Vblank2." In implementing an 80 Hz mode, the host system may set the length of the vertical blank period to "Vblank3" which is greater than "Vblank1" by "Y" and may adjust the length of the non-transition period of the data enable signal DE to correspond to "Vblank3." In implementing a 60 Hz mode, the host system may set the length of the vertical blank period to "Vblank4" which is greater than "Vblank1" by "Z" and may adjust the length of the non-transition period of the data enable signal to correspond to "Vblank4."

Figure 7:
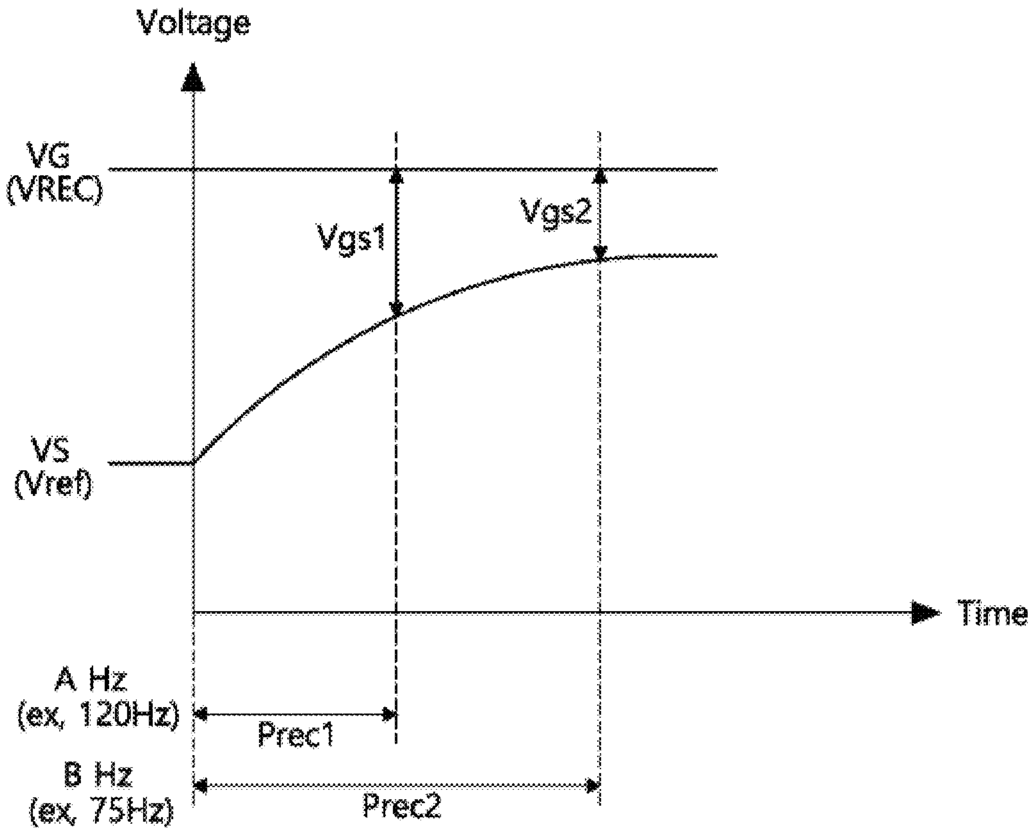
FIG. 7 is a diagram for describing an example where luminance distortion occurs in a sensing pixel due to a difference in the length of a vertical blank period in a variable frame frequency mode.

FIG. 7 is a diagram for describing an example where luminance distortion occurs in a sensing pixel due to a difference in the length of a vertical blank period in a variable frame frequency mode.

As illustrated in FIG. 7, when a length of a vertical blank period varies in a variable frame frequency mode, the respective lengths of recovery periods Prec1 and Prec2 may vary. For example, the length of the recovery period Prec2 corresponding to a frame frequency of 75 Hz may be longer than that of the recovery period Prec1 corresponding to a frame frequency of 120 Hz.

In a recovery period, a recovery data voltage VREC may be supplied to a gate electrode of a driving transistor DT included in a sensing pixel, and a reference voltage Vref may be supplied to a source electrode of the driving transistor DT. A pixel current flowing in the driving transistor DT may be proportional to a difference (i.e., a gate-source voltage Vgs) between a gate voltage VG and a source voltage VS. The source voltage VS may be increased by the pixel current, and when the recovery period is short, display driving of a next frame may start in a state where the source voltage VS does not sufficiently increase and is relatively low. For example, in comparison between the frame frequency of 75 Hz and the frame frequency of 120 Hz, a gate-source voltage Vgs1 may be relatively higher with the frame frequency of 120 Hz where a length of the recovery period Prec1 is relatively short, and a gate-source voltage Vgs2 may be relatively lower in 75 Hz where a length of the recovery period Prec2 is relatively long. Accordingly, luminance distortion may be more likely to occur with the frame frequency of 120 Hz where the recovery luminance of the sensing pixel is higher than the frame frequency of 75 Hz.

Figure 8:
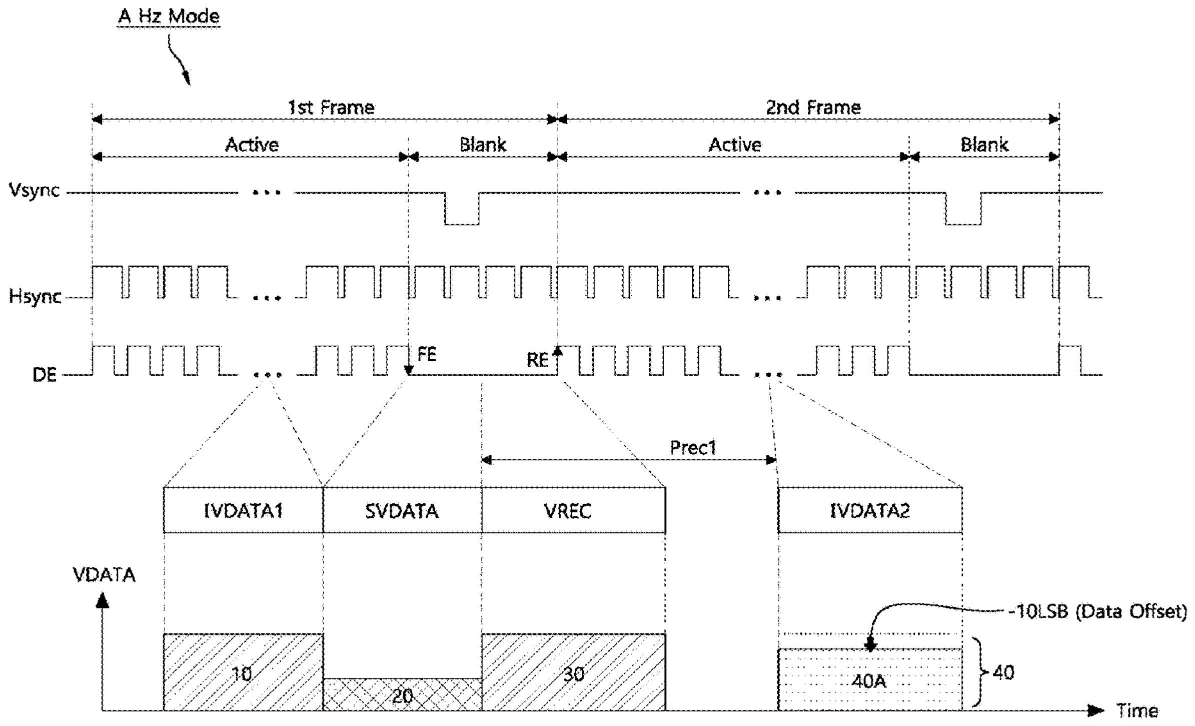
FIGS. 8 and 9 are diagrams for describing an example embodiment for decreasing luminance distortion occurring in a sensing pixel in a variable frame frequency mode.
Figure 9:
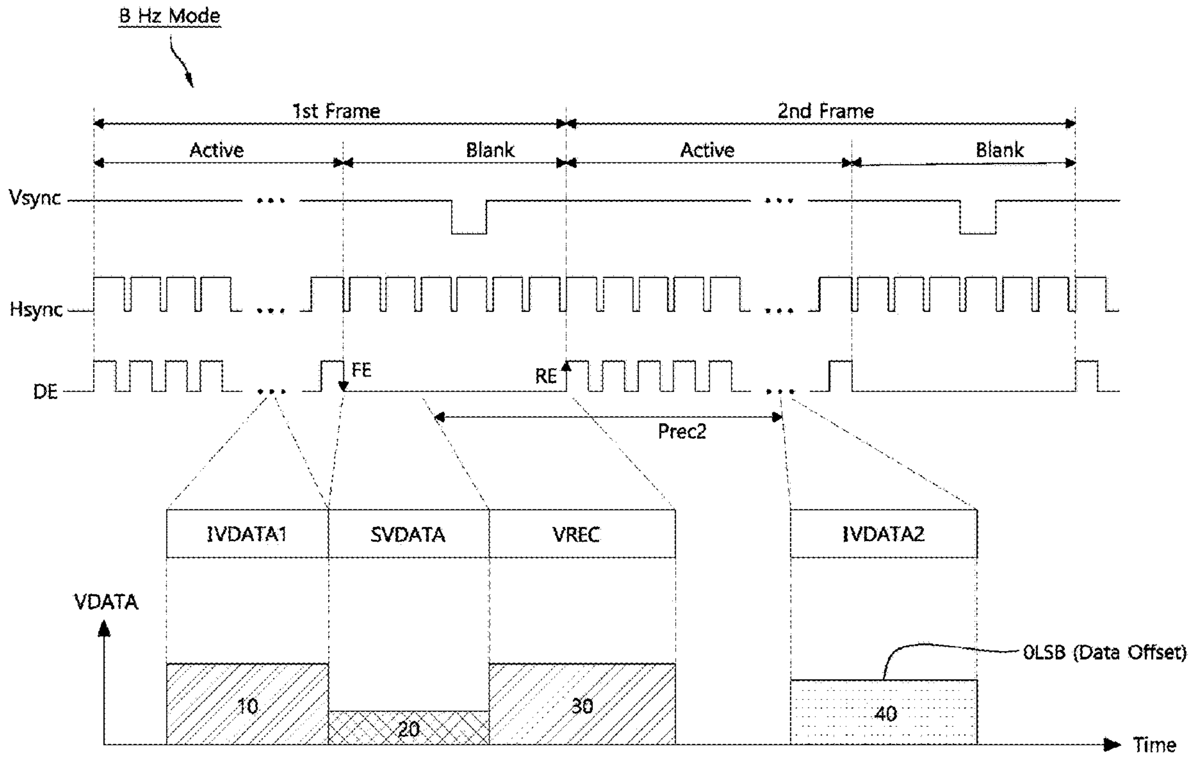

FIGS. 8 and 9 are diagrams for describing an example embodiment for decreasing luminance distortion occurring in a sensing pixel in a variable frame frequency mode. FIG. 10 is a diagram showing a lookup table where data offset values having different magnitudes are mapped to one another based on a length of a vertical blank period or a length of a recovery period.

FIG. 8 shows a driving waveform in an A Hz (where A is 120) mode, and FIG. 9 shows a driving waveform in a B Hz (where B is 75) mode.

As shown in FIG. 8, in the 120 Hz mode, a data voltage supply circuit may supply a sensing data voltage SVDATA 20 to a target pixel of a sensing pixel row in a sensing period within a vertical blank period of a first frame, may supply a recovery data voltage VREC 30 to the target pixel in a first recovery period Prec1 following the sensing period, and may supply a first display data voltage SVDATA2 40A to the target pixel in a vertical active period of a second frame following the first frame.

As shown in FIG. 9, in the 75 Hz mode, the data voltage supply circuit may supply the sensing data voltage SVDATA 20 to the target pixel of the sensing pixel row in the sensing period within the vertical blank period of a first frame, may supply the recovery data voltage VREC 30 to the target pixel in a second recovery period Prec2 following the sensing period, and may supply a second display data voltage IVDATA2 40 to the target pixel in a vertical active period of a second frame following the first frame.

As shown in FIGS. 8 to 10, to decrease luminance distortion occurring in a sensing pixel in a variable frame frequency environment, a level of the display data voltage IVDATA2 to be supplied to the target pixel in a vertical active period of the second frame may be set to increase in proportion to a length of the vertical blank period.

To this end, a timing controller may count the number of horizontal synchronization signals Hsync arranged between a falling edge FE of a last data enable signal DE of a first frame and a rising edge RE of a first data enable signal DE of a second frame to calculate a length of a vertical blank period. The timing controller may calculate respective lengths of recovery periods Prec1 and Prec2, and the recovery periods Prec1 and Prec2 may start in a vertical blank period of the first frame and may continue until before a display data voltage IVDATA2 is supplied to a target pixel in a vertical active period of the second frame. The respective lengths of recovery periods Prec1 and Prec2 may be proportional to a length of a corresponding vertical blank period.

As shown in FIG. 10, a count value Hsync_CNT of horizontal synchronization signals Hsync may denote a length of a vertical blank period. To increase a level of the display data voltage IVDATA2 in proportion to a length of a vertical blank period, the timing controller may read a data offset value corresponding to the count value Hsync_CNT of horizontal synchronization signals Hsync from a lookup table (for example, as shown in FIG. 10, the data offset value corresponding to Hsync_CNT=X1 is −10LSB, the data offset value corresponding to Hsync_CNT=X2 is −5LSB, the data offset value corresponding to Hsync_CNT=X3 is −1LSB, and the data offset value corresponding to Hsync_CNT=X4 is 0LSB, wherein $X1<X2<X3<X4$) and may add the data offset value to the display data voltage IVDATA2. In an example lookup table of FIG. 10, a magnitude of a data offset value may increase as a length of the vertical blank period (or a length of a corresponding recovery period) increases or a frame frequency is lowered.

For example, in a 120 Hz mode, a first display data voltage IVDATA2 40A may be obtained by adding a first data offset value (for example, −10 LSB) to the display data voltage IVDATA2, and in a 75 Hz mode, a second display data voltage IVDATA2 40 may be obtained by adding a second data offset value (for example, 0 LSB) to the display data voltage IVDATA2.

Because the first display data voltage IVDATA2 40A corresponding to the 120 Hz mode is less than the second display data voltage IVDATA2 40 corresponding to the 75 Hz mode, luminance distortion where a sensing pixel appear brighter may be prevented in the 120 Hz mode where a recovery period is relatively short. This is because display luminance is proportional to a level of a display data voltage.

Furthermore, regardless of a variation of a frame frequency and/or a position change of a target pixel, a level of a recovery data voltage VREC 30 may be set to be equal to that of a display data voltage IVDATA1 10 which is supplied to the target pixel in a vertical active blank of the first frame. In the present example embodiment, a level of the recovery data voltage may not be adjusted based on a position of the target pixel. To adjust a level of the recovery data voltage on the basis of a position of the target pixel, the timing controller should have information on a position-based length of a recovery period in advance. A concept of adjusting a level of a recovery data voltage, illustrated for example in FIG. 4, may be applied only to a case where a frame frequency is fixed and may not be applied in a variable frame frequency environment. This is because a length of a vertical blank period is calculated based on the rising edge RE of the first data enable signal DE of the second frame in the variable frame frequency environment, and thus, how a length of the recovery period may vary is not known prior to the rising edge RE of the first data enable signal ED of the second frame. That is, because the recovery period starts in the vertical blank period of the first frame before the rising edge RE of the first data enable signal DE of the second frame, the timing controller may not calculate a length of the vertical blank period at the start of the recovery period. Thus, a length of the vertical blank period (or a length of the recovery period) may not be known at the start of the recovery period.

Figure 11:
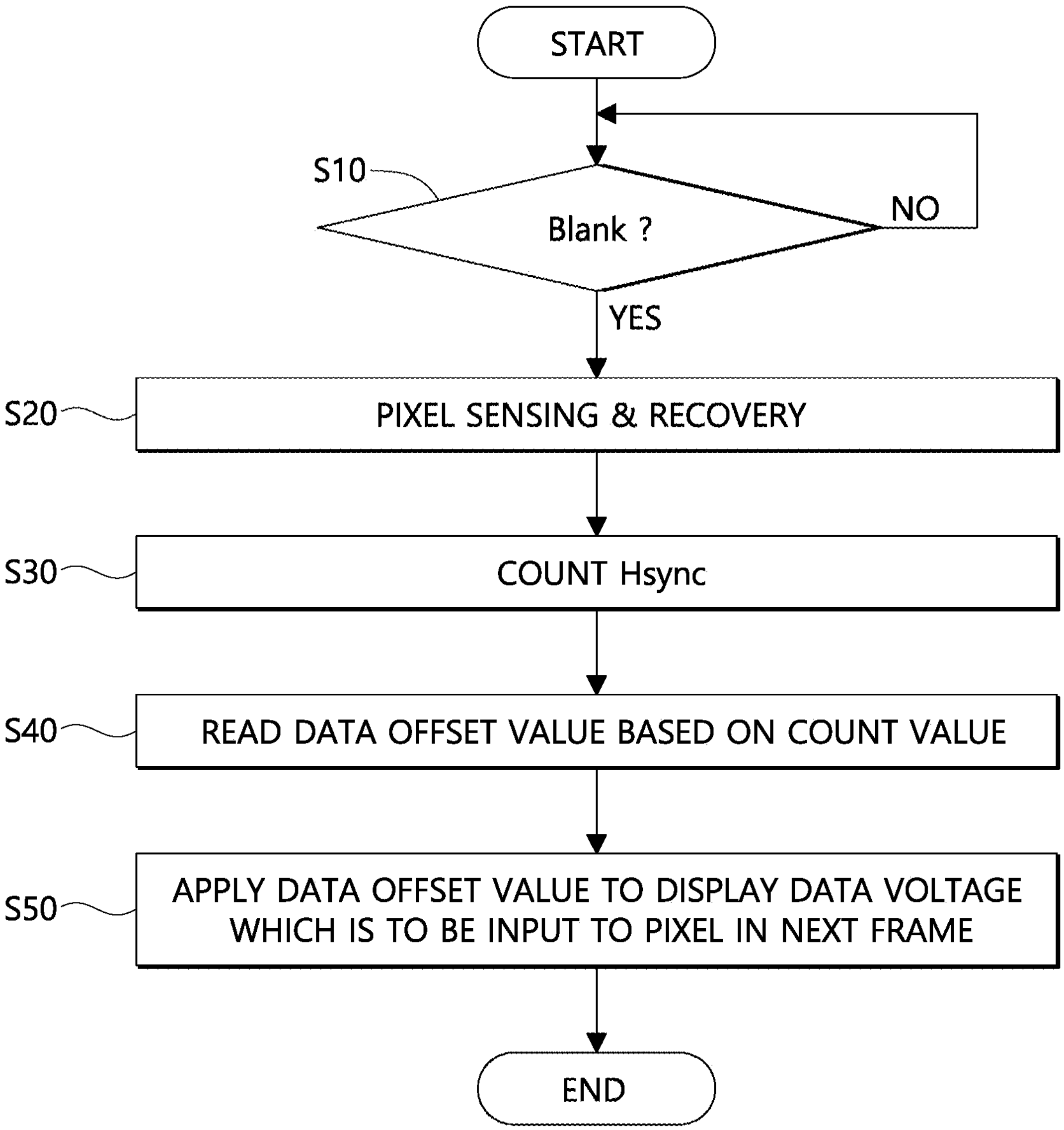
FIG. 11 is a diagram illustrating a panel driving method for decreasing potential luminance distortion occurring in a sensing pixel in a variable frame frequency mode.

FIG. 11 is a diagram illustrating a panel driving method for decreasing potential luminance distortion occurring in a sensing pixel in a variable frame frequency mode.

As shown in FIG. 11, a panel driving method according to an example embodiment of the present disclosure may supply a sensing data voltage to a pixel of a display panel in a sensing period within a vertical blank period and may sense an electrical characteristic of the pixel based on the sensing data voltage. Also, in a recovery period following the sensing period, the panel driving method may supply a recovery data voltage to the pixel to recover a display state of the pixel to a display state immediately before sensing (S10 and S20).

The panel driving method according to an example embodiment of the present disclosure may count a number of horizontal synchronization signals Hsync arranged in the vertical blank period to calculate a length of the vertical blank period (S30) to determine a count value. Also, the panel driving method may read a data offset value from a lookup table based on the count value and may apply the data offset value to a display data voltage to be input to the pixel in a next frame (S40 and S50). Thus, potential luminance distortion occurring in the pixel at a variable frame frequency environment may be reduced.

In an example embodiment of the present disclosure, a display data voltage to be supplied in a next frame may be adjusted based on a change in the length of a recovery period (or in the length of a vertical blank period) caused by a variation in a frame frequency in a variable frame frequency mode. Accordingly, in the present example embodiment, the distortion of luminance potentially caused by a difference in the length of a recovery period (or in the length of a vertical blank period) may be prevented or reduced, thereby enhancing display quality.

The features, aspects, and potential effects of the present disclosure are not limited to the above examples. Additional features, aspects, and potential effects may be apparent to those skilled in the art from the above or may be learned by practice of the inventive concepts provided herein. Other features, aspects, and potential effects of the inventive concepts may be realized and attained by the structure particularly pointed out in, or derivable from, the written description, the claims hereof, and the appended drawings.

Example embodiments of the present disclosure may also be described as follows:

According to an example embodiment of the present disclosure, an electroluminescent display apparatus may include: a display panel configured to display an image and including a pixel; a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel based on the sensing data voltage in the sensing period within the vertical blank period of the first frame. A level of the display data voltage to be supplied to the pixel in the vertical active period of the second frame may be determined based on a length of the vertical blank period of the first frame.

In some example embodiments, the electroluminescent display apparatus may further include a timing controller configured to determine the display data voltage based on the length of the vertical blank period so that the display data voltage increases with an increase in the length of the vertical blank period.

In some example embodiments, the timing controller may be further configured to determine the length of the vertical blank period based on a number of horizontal synchronization signals in the vertical blank period.

In some example embodiments, the timing controller may be further configured to determine the length of the vertical blank period, to determine a data offset value based on the length of the vertical blank period, and to determine the display data voltage by adding the data offset value to a data voltage corresponding to an input image data.

In some example embodiments, the recovery period may start in the vertical blank period of the first frame and may continue into the second frame until before the display data voltage is supplied to the pixel in the vertical active period of the second frame. A length of the recovery period may be proportional to the length of the vertical blank period.

In some example embodiments, the display panel may be configured to be driven with a variable frame frequency, and a length of the recovery period may be configured to increase as the frame frequency is lowered.

In some example embodiments, the electroluminescent display apparatus may further include a timing controller configured to determine the length of the recovery period, to determine a data offset value based on the length of the recovery period, and to determine the display data voltage by adding the data offset value to a data voltage corresponding to an input image data.

In some example embodiments, the data offset value may increase as the length of the recovery period increases or the frame frequency is lowered.

In some example embodiments, the timing controller may be further configured to: add a first data offset value to the data voltage provided in a first frame frequency; and add a second data offset value to the data voltage provided in a second frame frequency lower than the first frame frequency. The second data offset value may be greater than the first data offset value.

In some example embodiments, the data voltage supply circuit may be further configured to supply a first display data voltage to the pixel in a vertical active period of the first frame preceding the vertical blank period of the first frame. A level of the recovery data voltage may be equal to a level of the first display data voltage.

According to an example embodiment of the present disclosure, a panel driving device, for use with a display panel configured to display an image and including a pixel, may include: a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel based on the sensing data voltage in the sensing period within the vertical blank period of the first frame. A level of the display data voltage to be supplied to the pixel in the vertical active period of the second frame may be determined based on a length of the vertical blank period.

In some example embodiments, the display data voltage may increase with an increase in the length of the vertical blank period.

In some example embodiments, the recovery period may start in the vertical blank period of the first frame and may continue into the second frame until before the display data voltage is supplied to the pixel in the vertical active period of the second frame. A length of the recovery period may be proportional to the length of the vertical blank period.

In some example embodiments, the panel driving device may be configured to drive the pixel with a variable frame frequency. A length of the recovery period may be configured to increase as the frame frequency is lowered. The display data voltage may be determined by adding a data offset value to a data voltage corresponding to an input image data, the data offset value being determined based on the length of the recovery period.

In some example embodiments, the data offset value may be configured to increase as the length of the recovery period increases or the frame frequency is lowered.

In some example embodiments, a first data offset value may be configured to be added to the data voltage provided in a first frame frequency. A second data offset value may be configured to be added to the data voltage provided in a second frame frequency lower than the first frame frequency. The second data offset value may be greater than the first data offset value.

In some example embodiments, the data voltage supply circuit may be further configured to supply a first display data voltage to the pixel in a vertical active period of the first frame preceding the vertical blank period of the first frame. A level of the recovery data voltage may be equal to a level of the first display data voltage.

According to an example embodiment of the present disclosure, a panel driving method, for a display panel configured to display an image and including a pixel, may include: supplying a sensing data voltage to the pixel in a sensing period within a vertical blank period of a first frame and sensing an electrical characteristic of the pixel based on the sensing data voltage; supplying a recovery data voltage to the pixel in a recovery period following the sensing period; determining a display data voltage based on a length of the vertical blank period of the first frame; and supplying the display data voltage to the pixel in a vertical active period of a second frame following the first frame.

In some example embodiments, the determining of the display data voltage may include: determining a length of the vertical blank period by counting a number of horizontal synchronization signals in the vertical blank period; determining a data offset value corresponding to the counted number of horizontal synchronization signals; and adding the data offset value to a data voltage corresponding to an input image data to determine the display data voltage.

In some example embodiments, the determining of the display data voltage may include determining the display data voltage so that the display data voltage increases with an increase in the length of the vertical blank period.

It will be apparent to those skilled in the art that various modifications and variations can be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An electroluminescent display apparatus, comprising:

a display panel configured to display an image and including a pixel;

a data voltage supply circuit configured to supply a sensing data voltage to the pixel in a sensing period within a vertical blank period of a first frame and to supply a display data voltage to the pixel in a vertical active period of a second frame following the first frame; and a sensing circuit configured to sense an electrical characteristic of the pixel, wherein a level of the display data voltage to be supplied to the pixel in the vertical active period of the second frame is determined based on a length of the vertical blank period of the first frame.

2. The electroluminescent display apparatus of claim 1, further comprising a timing controller configured to determine the display data voltage based on the length of the vertical blank period so that the display data voltage increases with an increase in the length of the vertical blank period.

3. The electroluminescent display apparatus of claim 2, wherein the timing controller is further configured to determine the length of the vertical blank period based on a number of horizontal synchronization signals in the vertical blank period.

4. The electroluminescent display apparatus of claim 3, wherein the timing controller is further configured to count the number of horizontal synchronization signals arranged between a falling edge of a last data enable signal of the first frame and a rising edge of a first data enable signal of the second frame to calculate the length of the vertical blank period.

5. The electroluminescent display apparatus of claim 2, wherein the timing controller is further configured to determine the length of the vertical blank period, to determine a data offset value based on the length of the vertical blank period, and to determine the display data voltage by adding the data offset value to a data voltage corresponding to an input image data.

6. The electroluminescent display apparatus of claim 1, wherein:

the data voltage supply circuit is further configured to supply a recovery data voltage to the pixel in a recovery period following the sensing period.

7. The electroluminescent display apparatus of claim 6, wherein:

the recovery period starts in the vertical blank period of the first frame and continues into the second frame until before the display data voltage is supplied to the pixel in the vertical active period of the second frame, and a length of the recovery period is proportional to the length of the vertical blank period.

8. The electroluminescent display apparatus of claim 6, wherein:

the data voltage supply circuit is further configured to supply a first display data voltage to the pixel in a vertical active period of the first frame preceding the vertical blank period of the first frame, and a level of the recovery data voltage is equal to a level of the first display data voltage.

9. The electroluminescent display apparatus of claim 1, wherein:

the display panel is configured to be driven with a variable frame frequency, and the length of the vertical blank period is configured to vary based on a vertical synchronization signal and a data enable signal.

10. The electroluminescent display apparatus of claim 9, wherein:

the length of the vertical blank period is configured to increase as the frame frequency is lowered.

11. The electroluminescent display apparatus of claim 9, wherein:

the data voltage supply circuit is further configured to supply a recovery data voltage to the pixel in a recovery period following the sensing period, and the length of the recovery period is configured to increase as the frame frequency is lowered.

12. The electroluminescent display apparatus of claim 11, further comprising:

a timing controller configured to determine the length of the recovery period, to determine a data offset value based on the length of the recovery period, and to determine the display data voltage by adding the data offset value to a data voltage corresponding to an input image data.

13. The electroluminescent display apparatus of claim 12, wherein the data offset value increases as the length of the recovery period increases or the frame frequency is lowered.

14. The electroluminescent display apparatus of claim 12, wherein the timing controller is further configured to:

add a first data offset value to the data voltage provided in a first frame frequency; and add a second data offset value to the data voltage provided in a second frame frequency lower than the first frame frequency, and wherein the second data offset value is greater than the first data offset value.

15. An electroluminescent display apparatus, comprising:

a display panel configured to display an image and including a pixel;

a data voltage supply circuit configured to supply a sensing data voltage to the pixel in a sensing period within a vertical blank period of a first frame, to supply a recovery data voltage to the pixel in a recovery period following the sensing period, and to supply a display data voltage to the pixel in a vertical active period of a second frame following the first frame; and a sensing circuit configured to sense an electrical characteristic of the pixel, wherein a level of the display data voltage to be supplied to the pixel in the vertical active period of the second frame is determined based on a length of the recovery period of the first frame.

16. The electroluminescent display apparatus of claim 15, further comprising a timing controller configured to determine the display data voltage based on the length of the recovery period so that the display data voltage increases with an increase in the length of the recovery period.

17. The electroluminescent display apparatus of claim 16, wherein:

the recovery period starts in the vertical blank period of the first frame and continues into the second frame until before the display data voltage is supplied to the pixel in the vertical active period of the second frame, and a length of the vertical blank period is proportional to a length of the recovery period.

* * * * *